United States Patent [19]

Free

[11] Patent Number: 4,771,201

[45] Date of Patent: Sep. 13, 1988

[54] METHOD AND APPARATUS FOR THERMIONIC ENERGY CONVERSION

[75] Inventor: Bernard A. Free, Derwood, Md.

[73] Assignee: Intelsat, Washington, D.C.

[21] Appl. No.: 187,894

[22] Filed: Sep. 17, 1980

Related U.S. Application Data

[63] Continuation-in-part of Ser. No. 932,571, Aug. 10, 1978, abandoned.

[51] Int. Cl.[4] .............................................. H02N 7/00
[52] U.S. Cl. .................................................... 310/306
[58] Field of Search ......................................... 310/306

[56] References Cited

U.S. PATENT DOCUMENTS

| | | | |
|---|---|---|---|
| 2,915,652 | 12/1959 | Hatsopoulos et al. | 310/306 |
| 3,041,481 | 6/1962 | Peters, Jr. et al. | 310/306 |
| 3,162,778 | 12/1964 | Durant | 310/306 |
| 3,254,244 | 5/1966 | Gottlieb et al. | 310/306 |

Primary Examiner—Donovan F. Duggan
Attorney, Agent, or Firm—Sughrue, Mion, Zinn, Macpeak, and Seas

[57] ABSTRACT

A thermionic energy conversion method and apparatus is disclosed that eliminates or substantially reduces deficiencies caused by space charge or thermal radiation losses from the emitter to the collector. The method and apparatus uses an acceleration electrode having an aperture and disposed in the space between the emitter and collector. A high positive voltage is applied to the acceleration electrode to generate a positive electrostatic field. The shape of the facing surfaces of the emitter and collector and the shape of the acceleration electrode shape the electrostatic field to cause boiled-off electrons from the emitter to be accelerated and converged so that they all pass through the aperture without impinging on the acceleration electrode.

7 Claims, 2 Drawing Sheets ered by the use of less desirable combinations of emitter and collector work functions and temperature with considerable sacrifice in efficiency and/or power density.
METHOD AND APPARATUS FOR THERMIONIC ENERGY CONVERSION This application is a continuation-in-part of application Ser. No. 932,571, filed Aug. 10, 1978, now abandoned.

BACKGROUND OF THE INVENTION

The present invention generally relates to thermionic energy conversion and, more particularly, to improved thermionic energy converters wherein an acceleration electrode and shaped surfaces of the emitter and collector produce a convergent/divergent electron flow, and the acceleration electrode doubles as a thermal radiation shield.

Thermionic energy converters are generally diode devices based on the Edison effect. A heated emitter emits electrons which are collected by a low-temperature collector. Any heat source may be used to heat the emitter, but solar furnaces show considerable promise. However, as a means of solar energy conversion, thermionic energy converters must compete with photovoltaic systems. While, in theory at least, thermionic energy converters would appear to be quite competitive with photovoltaic systems, especially in regard to high potential values of the power-to-mass ratio, in practice, considerable difficulties have been encountered in the development of thermionic energy converters.

A typical thermionic energy converter consists of two plane parallel electrodes separated by a high-vacuum or low-pressure gas. The high-temperature emitter has a high work function, and the low temperature collector has a lower work function. Electrons boil off the emitter, and some of them reach the collector to produce a net current flow through the device. A voltage difference equal to the difference in work functions of the emitter and collector is theoretically possible. When the space between the emitter and collector is a vacuum, a large portion of the electrons boiled off the emitter are prevented from reaching the collector by a negative space charge which builds up between the two electrodes. Very close spacing (~10 microns) of the electrodes is therefore essential to produce any appreciable current. The spacing and the space charge problems has led to the almost exclusive use of gas filling for most applications. A small amount of cesium in the diode envelope produces a vapor which alleviates the space charge problem somewhat, but this also has the property of altering the work functions of the emitter and collector, depending on the temperature and surface coverage.

Another disadvantage of the typical thermionic energy converter is thermal radiation from the hot emitter to the cooler collector. This radiation loss can be reduced by the use of less desirable combinations of emitter and collector work functions and temperature with considerable sacrifice in efficiency and/or power density.

The upper bound of efficiency for thermionic energy converters is dictated by the ideal Carnot cycle efficiency. Cesium-filled thermionic devices have been operated in the 20% efficiency range (up to about 35% of the Carnot cycle efficiency) for short periods, and in the 10–15% efficiency range with longer lifetimes. Thus, the promise of relatively high efficiency energy conversion in a practical device has not been realized.

SUMMARY OF THE INVENTION

It is an object of the present invention to provide a thermionic energy conversion method and apparatus that prevents or reduces space charge limitation of the electron current density.

It is another object of the present invention to provide a thermionic energy conversion method and apparatus that substantially reduces thermal radiation loss from the emitter to the collector.

According to the method and apparatus of the present invention, the foregoing and other objects are accomplished by providing an acceleration electrode having an aperture and disposed in the space between the emitter and collector. A high positive potential is applied to the acceleration electrode to generate an electrostatic field of positive potential. The shape of the surfaces of the emitter and collector facing each other, together with the shape of the acceleration electrode appropriately shape the electrostatic field. Heat is applied to the emitter, causing electrons to boil off. The shaped electrostatic field causes the boiled-off electrons to be accelerated and converged so that they all pass through the aperture without impinging on the acceleration electrode. The boiled-off electrons which have passed through the aperture are then decelerated to near thermal velocity and diverged by the shaped electrostatic field before they impinge on the surface of the collector. The use of the shaped electrostatic field prevents formation of space charge between the emitter and collector. Thermal radiation loss is substantially reduced in the thermionic energy conversion method and apparatus of the present invention by providing thermal insulation to the acceleration electrode, thereby preventing thermal radiation loss from the emitter to the collector except through the aperture. Because the area of the aperture is small compared with the area of the emitter, a substantial reduction in the thermal radiation loss can be achieved.

BRIEF DESCRIPTION OF THE DRAWINGS

The invention will be better understood from the following detailed description with reference to the accompanying drawings, in which.

DETAILED DESCRIPTION OF THE INVENTION

Figure 1:
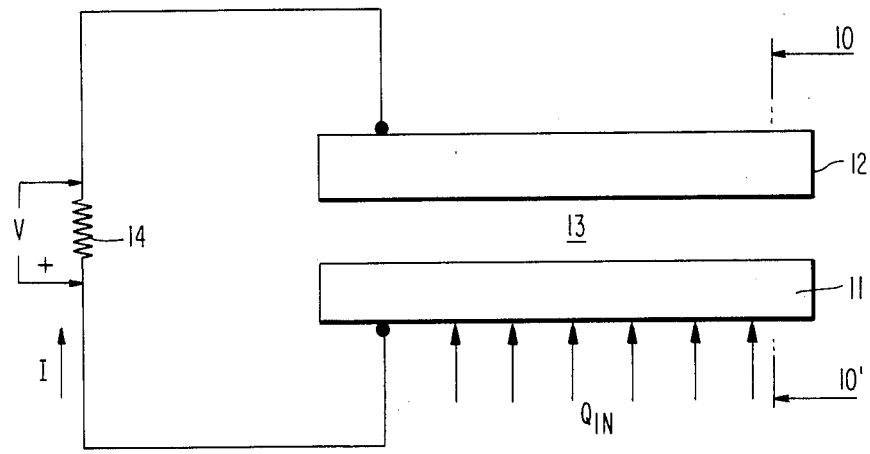
FIG. 1 is a diagrammatic representation of a conventional thermionic energy conversion apparatus.

Referring now to the drawings and, more particularly, to FIG. 1, the basic principles of operation of thermionic energy conversion devices will first be described in the context of a typical, conventional structure. As shown in the figure, an emitter 11 is separated from a collector 12 by a space 13 which may be a vacuum or contain a gas. A load 14 is connected across the emitter and collector. The input heat ($Q_{IN}$) to the emitter must be sufficient to allow electrons to boil off the surface of the emitter facing the collector. The electrons which boil off the emitter 11 are called free electrons because they possess an energy level sufficient to allow them to escape the emitter. Some of the free electrons have sufficient energy to traverse the space separating the emitter and the collector and are absorbed by the collector 12. The free electrons traveling from the emitter 11 to the collector 12 cause electrons to flow through the load 14 in the direction from the collector to the emitter, but according to standard electrical convention, current I is said to be flowing through the load from the emitter to the collector. Because the metal or alloy of the emitter is chosen to have a work function ($\phi_E$) having a value greater than that of the work function ($\phi_C$) of the metal or alloy of the collector, a positive electric potential exists between the emitter and collector. Thus, electrical power ($P_{OUT}$) flows from the emitter to the collector.

Figure 2:
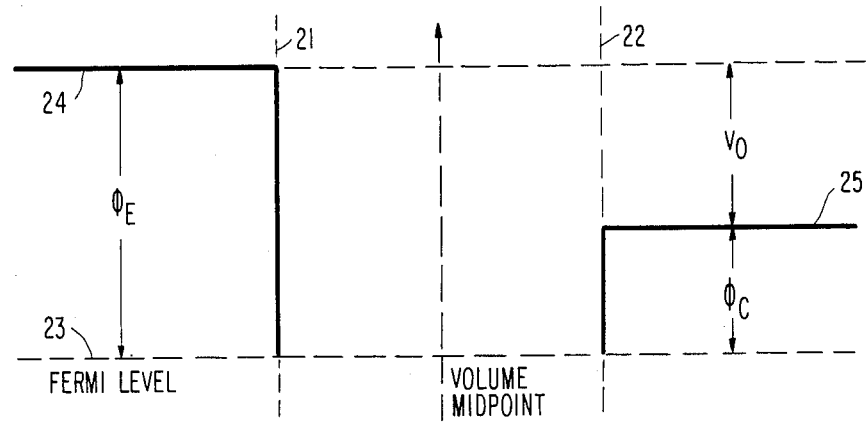
FIG. 2 is an idealized potential diagram of the thermionic energy conversion apparatus shown in FIG. 1, where the horizontal axis represents the physical dimensions of the emitter, collector and space therebetween taken along line 10—10' of FIG. 1, and the vertical axis represents the voltage potentials.

FIG. 2 shows the ideal potential diagram of the thermionic energy conversion device shown in FIG. 1. Vertical line 21 represents the surface of the emitter 11 facing the collector 12, and vertical line 22 represents the surface of the collector 12 facing the emitter 11. Horizontal line 23 represents the Fermi levels of the emitter and collector, which are of equal value. Horizontal line 24 represents the work function $\phi_E$ of the emitter, i.e., the energy level at which electrons boil off the emitter. Horizontal line 25 represents the work function $\phi_C$ of the collector, i.e., the energy level at which electrons condense on the collector.

As is well known in the art, each metal or alloy exhibits a unique work function $\phi$, defined as the difference in electrical potential between the free and the Fermi levels of the metal or alloy. A reference listing the work function $\phi$ of many metals and alloys may be found in the book by V. S. Fomenko (edited by G. V. Samsonov), entitled *Handbook of Thermionic Properties (Electronic Work Functions and Richardson Constants of Elements and Compounds)* (authorized translation from Russian), Plenum Press Data Division, New York, 1966. The value of $\phi$ for each metal or alloy does not vary with temperature in the range below the melting point of the metal or alloy, except for minor second- and third-order effects.

As is well known, the energy distribution of electrons in a metal or alloy below the melting point assumes the Fermi-Dirac distribution. The Fermi-Dirac distribution is shown and described in the book by G. W. Sutton, entitled *Direct Energy Conversion*, McGraw-Hill Book Company, New York, 1966, at FIG. 5-3, page 242. As described in this reference, the percentage of electrons having an energy level greater than the free electron energy level ($\epsilon_o$) increases with temperature. The energy distribution of the boiled-off electrons assumes the Boltzman distribution. It is apparent that the higher the $\phi$ of the metal or alloy, the greater the free electron energy level and the smaller the percentage of boiled-off electrons for a given temperature.

For a thermionic energy conversion device, $\phi_E > \phi_C$. In the ideal case, all boiled-off electrons from the emitter travel across the space 13 separating the emitter 11 and collector 12 and impinge on the surface of the collector facing the emitter. The current density of these boiled-off electrons increases with temperature and is given by the Richardson equation:

$$J_s = 1.2 \times 10^6 T_E \exp - \left( \frac{e\phi_E}{kT_E} \right) \quad (1)$$

where:
$J_s$ is the saturation current density of the boiled-off electrons amperes per meter squared;
$1.2 \times 10^6$ is the Richardson constant;
$T_E$ is the temperature of the emitter in degrees Kelvin;
e is the electronic charge; and
k is the Boltzman constant.
The heat $Q_{IN}$ applied to the emitter, expressed in watts per meter squared, is given by the following equation:

$$P_{IN} = J_s(\phi_E + 2\theta_E) \quad (2)$$

where:
$P_{IN}$ is the heat applied to the emitter expressed in watts per meter squared; and
$\theta_E$ is the voltage equivalent of temperature (the factor of 2 is present to account for lateral components of electron velocity).
The electric power output of the idealized thermionic energy converter is given by:

$$P_{OUT} = J_s(\phi_E - \phi_C) \quad (3)$$

where:
$P_{OUT}$ is the electric power output to the load 14 in watts per meter squared.
Thus, the efficiency of the thermionic energy converter in the ideal case is:

$$\eta = \frac{P_{OUT}}{P_{IN}} = \frac{J_s(\phi_E - \phi_C)}{J_s(\phi_E + 2\theta_E)} \quad (4)$$

Equation (4) shows that even in the ideal case, when $\phi_C = 0$, it is impossible to achieve $\eta = 100\%$ because the factor $2\theta_E$ is always present in the denominator. It should be noted that $\theta_E$ is solely dependent on temperature.

Equations (1)–(4) show that the desired parameters for a thermionic energy converter are a high value for $\phi_E$; a low value for $\phi_C$; a high value for $T_E$; a low value for $T_C$; and a low value for $\theta_E$.

Figure 3:
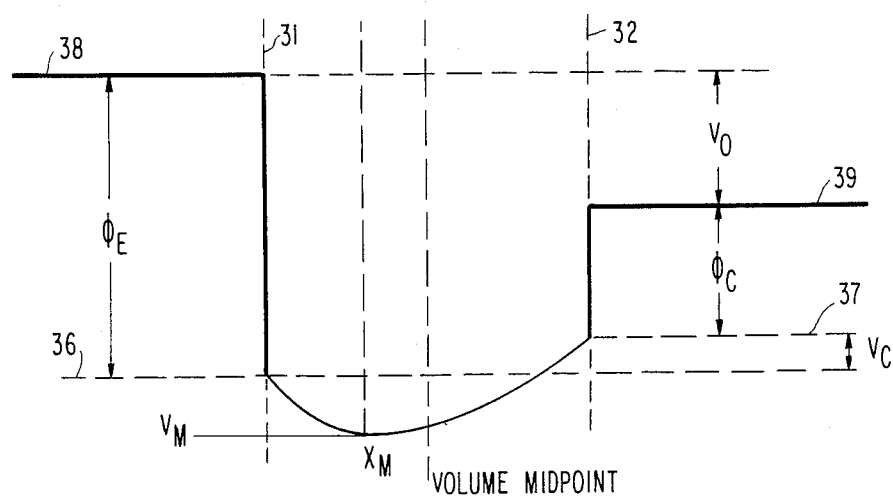
FIG. 3 is a potential diagram typical of a prior art thermionic energy conversion apparatus.

FIG. 3 shows the real potential diagram of a prior art thermionic energy converter, where the horizontal axis of the figure represents the physical dimensions of the emitter, collector and the space therebetween taken along line 10—10' of FIG. 1, and the vertical axis represents voltage potentials. Vertical line 31 is the same as the vertical line 21 of FIG. 2 and signifies the surface of the emitter 12 facing the collector 11. Vertical line 32 signifies the surface of the collector facing the emitter. Horizontal line 36 represents the Fermi level of the emitter 11. Horizontal line 37 represents the Fermi level of the collector 12 and is displaced in the positive voltage direction from the Fermi level of the emitter by a voltage amount $V_C$. Horizontal line 38 represents the work function $\phi_E$ of the emitter, and horizontal line 39 represents the free electron energy level of the collector.

Unlike the ideal case, all of the electrons having sufficient energy to boil off the emitter 11 do not have sufficient energy to travel across the space 13 separating the emitter and collector and to impinge on the surface of the collector 12 facing the emitter. Instead, only those boiled-off electrons whose energy levels fall in the upper range of the Boltzman energy distribution have sufficient energy to traverse the emitter/collector volume. The remaining boiled-off electrons are reflected back towards the emitter face and form an electron space charge layer or "potential hill." This space charge layer in the interelectrode space has a negative voltage value $V_M$ and is displaced from the emitter surface in the x direction by the distance $x_M$, as shown in FIG. 3. Only those boiled-off electrons having an energy level greater than $V_M$ can traverse the space between the emitter and collector and impinge on the collector. The space charge limited current density $J_{SCL}$ of the boiled-off electrons which reach the collector depends on the saturated current density $J_S$, the emitter temperature $T_E$, and the potential minimum $V_M$, and is given by:

$$J_{SCL} = J_S \exp \frac{eV_m}{RT_E} \qquad (5)$$

Typically, the value for $J_{SCL}$ is only 20% of the value of $J_S$ that would exist if the prior art vacuum thermionic energy converter operated in the ideal manner, which means that only one-out-of-five boiled-off electrons reaches the collector surface.

Besides current limiting due to the space charge, the thermal radiation from the emitter to the collector also causes an appreciable deterioration in performance of prior art thermionic energy converters. The reduction in the useful power applied by the heat source to the emitter due to both the thermal radiation and the space charge is summarized in the following equation:

$$P_{IN} = J_{SCL}(\phi_E + 2\theta_E - V_M) + a(T_E^4 - T_C^4) \qquad (6)$$

where:
$P_{IN}$ is the heat applied to the emitter expressed in watts per meter squared;
$V_M$ is the voltage level of the space charge layer and is always a negative voltage; and
a is a constant.

Equation (6), at first glance, seems to suggest that the thermal radiation loss can be rapidly reduced by making the value for $T_C$ approach the value for $T_E$. However, a large differential between $T_E$ and $T_C$ must be maintained since $T_E$ must be high to overcome the high emitter work function $\phi_E$, whereas $T_C$ must be low to prevent electron boil-off from the collector reaching the emitter. Space charge current $J_{SCL}$ can be increased by reducing the interelectrode gap, and this is commonly done. However, it is impractical to reduce the gap below about $10\mu$, and it is at this value that the SCL current is about 20% of the emission current.

The electric power output of prior art vacuum thermionic energy converter is given by:

$$P_{OUT} = J_{SCL}(\phi_E - \phi_C - V_C) \qquad (7)$$

where:
$P_{OUT}$ is the electric power output to the load in watts per meter squared; and
$V_C$ is the reference voltage point of the Fermi level of the collector.
A typical value for $P_{OUT}$ has been less than 10 kW per meter squared.

Because of the space charge limitation and the thermal radiation from the hot emitter to the cold collector, prior art vacuum thermionic energy converters do not achieve an efficiency greater than 10%, with 5% being the more typical value. This level of efficiency is substantially less than that predicted in the idealized version given above and accounts for the lack of commercial interest in presently-available vacuum thermionic energy converters.

The gas-filled thermionic energy converter, wherein the working fluid is composed of gaseous atoms and ions as well as electrons, represents a significant improvement over the vacuum thermionic energy converters discussed heretofore. The gas is typically cesium vapor, a portion of which is ionized either by surface or volume ionization mechanisms. The positive cesium ions reduce the detrimental negative space charge of the electrons significantly so that the SCL current is increased, but the radiation loss remains high. The presence of cesium also modifies (lowers) the work functions of both emitter and collector and produces a pronounced temperature effect on the work function. Cesium-filled thermionic energy converters must be designed to withstand the highly corrosive environment and to avoid electrical leakage and poisoning effects owing to the presence of the working gas and impurities. Cesium-filled converters have been operated briefly at power densities exceeding 100 kW/m² and efficiencies approaching 20%. For longer lifetimes, a power density of ~20 kW/m² and an efficiency of about 13–14% is typical of cesium-filled converters.

The present invention uses electron optical focusing to accelerate the boiled-off electrons from the emitter so that the electron current density J approaches the $J_S$ value for the temperature $T_E$ and work function $\phi_E$ of the emitter, and uses electron optics to defocus and decelerate the accelerated boiled-off electrons so that the boiled-off electron beams diverge in transit to the collector, the divergence of the boiled-off electron beams eliminating the space charge. The electrons are decelerated by the electron optics to a speed approaching thermal velocity, e.g., less than a few ev. The acceleration of the boiled-off electrons prevents space charge adjacent the surface of the emitter, while the deceleration and defocusing of the accelerated boiled-off electron beams near the collector causes the electron beams to diverge, thereby reducing the number of electrons per cubic centimeter near the surface of the collector and thus drastically reduces the level of the space charge adjacent the surface of the collector facing the emitter.

In order to accelerate the boiled-off electrons, a third electrode having an aperture is placed between the emitter and collector. A positive potential substantially greater than the value of $\phi_E$ is applied to the third or acceleration electrode to generate an electrostatic field. The shape of the emitter surface facing the collector, the shape of the collector surface facing the emitter and the shape of the acceleration electrode appropriately shape the electrostatic field so that it converges and accelerates and then diverges and decelerates the boiled-off electrons as they travel from the emitter surface through the aperture in the acceleration electrode and on to the collector surface. Because the focusing of the boiled-off electrons is such that very few boiled-off electrons impinge on the acceleration electrode, a very small electric current is caused to flow between the acceleration electrode and the emitter and/or collector. Because very little electric current is flowing between the emitter and the acceleration electrode or between the acceleration electrode and the collector, the acceleration electrode uses very little electric power and thus does not introduce any significant energy loss.

Figure 4:
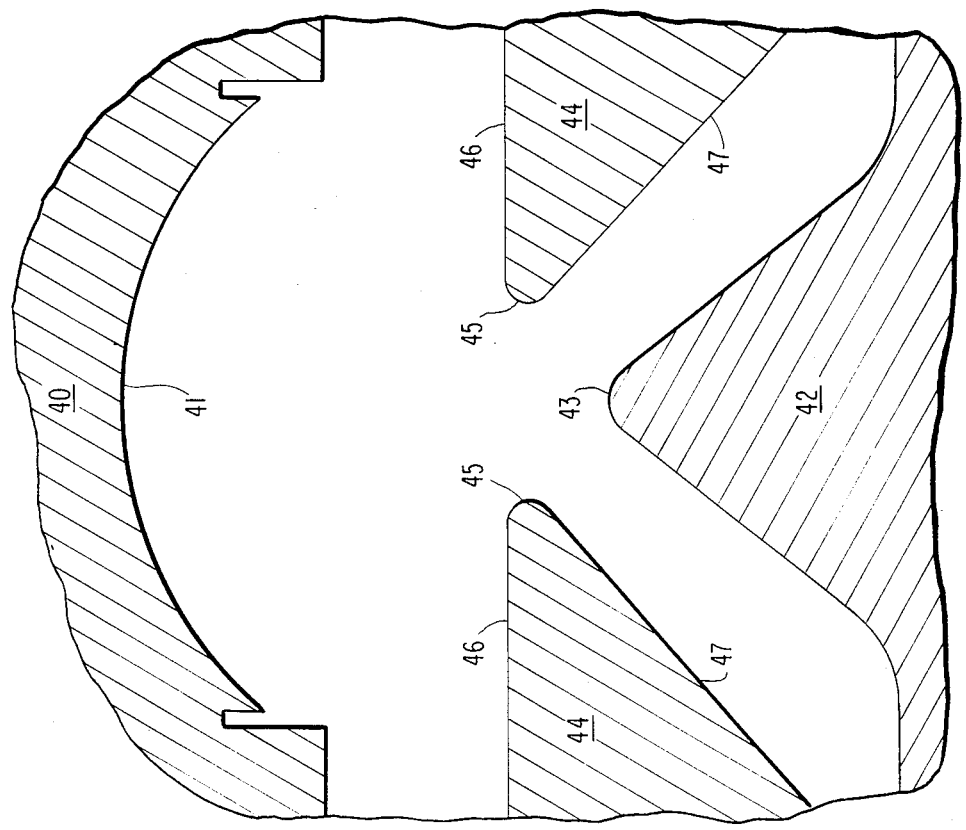
FIG. 4 is a cross-sectional view of a preferred embodiment of the thermionic energy conversion apparatus of the present invention.

Turning now to FIG. 4, one embodiment of the apparatus of the present invention is shown. An emitter 40 has a concave-shaped surface 41 which faces a collector 42. In contrast, collector 42 has a convex-shaped surface 43 which faces the surface 41 of emitter 40. Disposed in the space defined by surfaces 41 and 43 is an acceleration electrode 44 having an axisymmetric aperture 45.

Emitter 40 can be constructed using any metal or alloy which exhibits the desired electrical and thermal parameters. Similarly, collector 42 can be constructed using any metal or alloy which exhibits the desired electrical and thermal parameters. Acceleration electrode 44 can be constructed using any material which will create the desired electrostatic field when the appropriate electric potential is applied; however, the material used to construct acceleration electrode 44 must be able to withstand the thermal stress present between "hot" surface 41 and "cold" surface 43.

Figure 5:
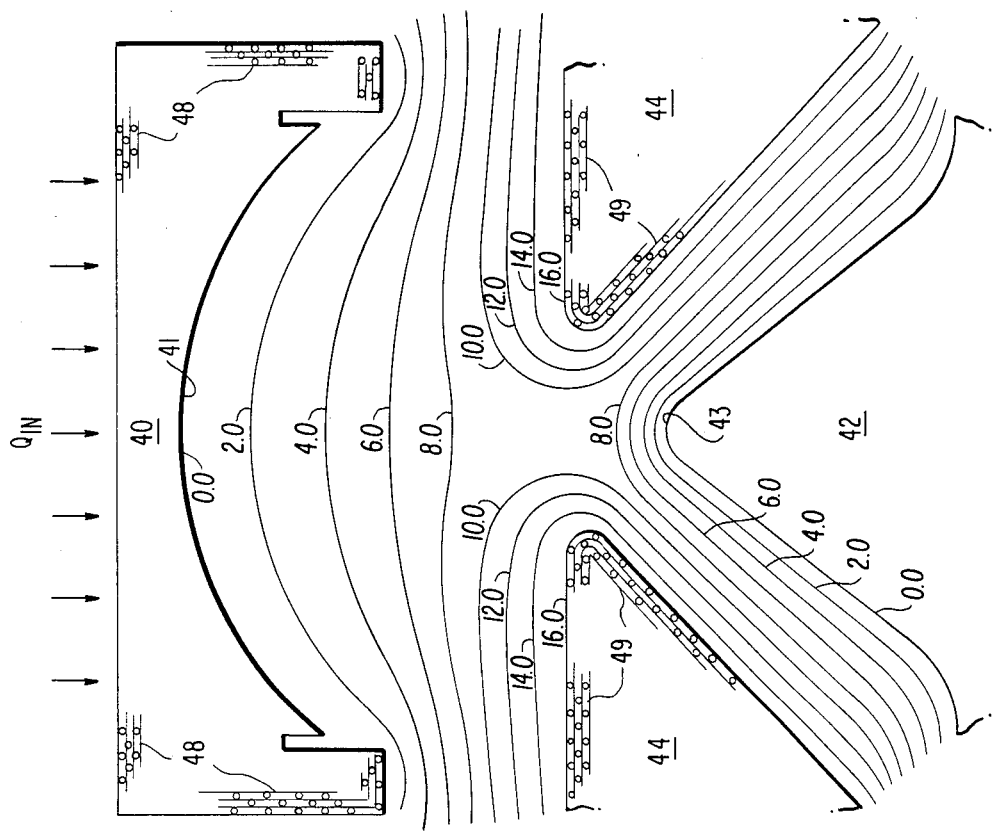
FIG. 5 is a view similar to FIG. 4, with the addition of equipotential surface plots.

The positively charged acceleration electrode 44 produces a positive electrostatic field shaped by surfaces 41 and 43 as well as the surfaces 46 and 47 of the acceleration electrode so that the boiled-off electrons are properly focused to travel from surface 41, through aperture 45, to surface 43. For purposes of explanation, a positive potential of +16 arbitrary units is applied to acceleration electrode 44, as shown in FIG. 5. A potential of 0 units is applied to emitter 40 and to collector 42. The resulting electrostatic field having equipotential surfaces in the range from 0 to +16 units is shown in FIG. 5. The values of the equipotential surfaces shown in FIG. 5 were obtained using analog plot techniques using conductive paper, as is well known in the art. The positive electrostatic field accelerates the boiled-off electrons and converges or focuses them so that they pass through aperture 45 without impinging on the acceleration electrode 45. The acceleration of the boiled-off electrons prevents the formation of any space charge and thus allows the value of the current density J to approach the value of $J_S$, specified by the temperature $T_E$ and the work function $\phi_E$. The positive electrostatic field also decelerates the boiled-off electrons coming through aperture 45 to near thermal velocities, and diverges the electron beam. The deceleration of the boiled-off electrons and the divergence of the electron beam also prevents the creation of space charge.

The method and apparatus of the present invention can also overcome the deficiency of thermal radiation loss from the emitter to the collector found in prior art thermionic energy converters. As shown in FIG. 5, the "hot" emitter 40 can be provided with thermal insulation 48 on all surfaces except surface 41. More importantly, however, acceleration electrode 44 can be provided throughout with thermal insulation 49 so that the electrode 44 acts as a thermal radiation shield (except for aperture 45) as well as an electrostatic field generator. Thermal insulation 48 and 49 can be made out of any material and can be any configuration so long as the required thermal insulation is provided without physical or electrical deterioration. The acceleration electrode is preferably constructed of multiple layers of metal foil separated by metal wires or stand-offs, as generally illustrated in the figure.

The power output of a thermionic energy converter according to the present invention can be calculated as follows:

$$P_{OUT} = J(\phi_E \phi_C - V_C) \quad (8)$$

The thermal radiation loss in the embodiment of the present invention shown in FIGS. 4 and 5 due to aperture 45 can be expressed as follows:

$$P_{RAD} = \frac{\sigma \left(\frac{A_{ACC}}{A_E}\right)(T_E^4 - T_C^4)}{(\epsilon_E^{-1} + \epsilon_C^{-1} + 1)} \quad (9)$$

where:
$P_{RAD}$ is the net power radiated from the emitter surface 41 to collector surface 43 expressed in watts per meter squared;
$\sigma$ is the Stefan-Boltzman constant;
$\epsilon_E$ and $\epsilon_C$ are the effective emissivities of the emitter and collector, respectively (here, both taken to be 0.8 because of the presence of the aperture which simulates a black cavity);
$A_{ACC}$ is the area in meters squared of aperture 45; and
$A_E$ is the area in meters squared of emitter surface 41.

The efficiency $\eta$ of a thermionic energy converter according to the present invention is as follows:

$$\eta = \frac{J(\phi_E - \phi_C - V_C)}{J(\phi_E - V_M - 2\theta_E) + P_{RAD}} \quad (10)$$

Table 3 shown below provides a comparative example of the performance of a vacuum thermionic energy converter according to the present invention and that of a prior art vacuum thermionic energy converter. It will be understood that this table is by way of example only and does not constitute an upper limit on the performance of the present invention. The prior art thermionic energy converter utilized an emitter and collector whose facing surfaces are parallel and are separated by a distance of 7 microns, as shown in FIG. 1. The apparatus of the present invention is that shown in FIGS. 4 and 5.

TABLE 3

| PARAMETER | PRIOR ART | PRESENT INVENTION |
|---|---|---|
| J, ($J_S$), A/cm$^2$ | 1.65 (9.37) | 1.58 (1.58) |
| $\phi_E$, volts | 2.04 | 3.0 |
| $\phi_C$, volts | 1.60 | 1.6 |
| $V_C$, volts | 0.1 | 0.1 |
| $V_M$, volts | −0.5 | 0 |
| $\theta_E$, volts | 0.12 | 0.15 |
| $T_E$, °K. | 1373 | 1800 |
| $T_C$, °K. | 873 | 873 |
| $P_{RAD}$, W/cm$^2$ | 2.19 | 1.79 ($A_{ACC}/A_E$ = 1/9) |
| $P_{OUT}$, W/cm$^2$ | 0.5 | 2.05 |
| $\eta$ | 0.096 | 0.292 |

As Table 3 shows, the thermionic energy converter according to the present invention exhibits an efficiency of 29.2%, whereas the prior art thermionic energy converter exhibits an efficiency of 9.6%. In part, this increase in efficiency is due to the reduction in thermal radiation loss from the emitter to the collector. The reduction in radiation loss allows a greater amount of heat $Q_{IN}$ to be applied to the emitter, allowing for either a greater value for $\phi_E$ or higher current density or some combination thereof. The reduction in radiation loss allows for a "cooler" collector, allowing for a reduction in the value of $\phi_C$.

While the invention has been described in terms of a preferred embodiment, those skilled in the art will recognize that various modifications and alterations can be made without departing from the spirit and scope of the invention. For example, in the practice of the present invention, either a vacuum or a working fluid, such as cesium or mercury vapor, can be used. When a working fluid is used, $\phi_E$ and $\phi_C$ may change, and this change must be taken into account in the design procedure. Also, more than one pair of the emitter and the collector can be used in tandem, and the acceleration electrode can be provided with more than one aperture if the electrostatic field is properly shaped and the necessary focusing occurs. The essential features of the present invention may be summarized as follows: (1) the entire saturation current of electrons emitted is accelerated through the aperture in the acceleration electrode and thence onto the collector without space charge buildup; and (2) the heat shielding of the acceleration electrode reduces the thermal radiation loss to a small fraction of that exhibited by the prior art.

What is claimed is:

1. A method of thermionic energy conversion comprising the steps of:
    (a) applying heat to an emitting electrode to cause electrons to boil off;
    (b) accelerating and converging said boiled-off electrons with a purely electrostatic field; and
    (c) decelerating, to near thermal velocity, and diverging said boiled-off electrons with said electrostatic field; and
    (d) collecting said boiled off electrons on a collecting electrode, whereby electric power is generated across said emitting and collecting electrodes.

2. A method of thermionic energy conversion as recited in claim 1 wherein said electrostatic field is generated by applying a positive potential to an acceleration electrode positioned between said emitter and said collector.

3. A method of thermionic energy conversion as recited in claim 1 further comprising the step of thermally insulating said emitting electrode from said collecting electrode.

4. A thermionic energy conversion apparatus having a spaced-apart heated electron emitter and a relatively cooler electron collector, the improvement comprising means for producing an electrostatic field disposed between said emitter and collector for accelerating and converging said boiled-off electrons from said emitter towards said collector and for decelerating said boiled-off electrons to near thermal velocity and diverging said boiled-off electrons as said boiled-off electrons approach said collector.

5. A thermionic energy conversion apparatus as recited in claim 4, the improvement further comprising means disposed between said emitter and said collector for thermally insulating said emitter from said collector.

6. A thermionic energy conversion apparatus as recited in claim 5 wherein said means for producing an electrostatic field and said means for thermally insulating are both composed of an electrically conductive, thermally insulative acceleration electrode having an aperture and disposed between said emitter and said collector, said acceleration electrode being biased to a positive voltage with respect to said emitter and said collector.

7. A thermionic energy conversion apparatus as recited in claim 6 wherein the surface of said emitter facing said collector has a generally concave shape, and the surface of said collector facing said emitter has a generally convex shape.

* * * * *